United States Patent [19]
Adler et al.

[11] Patent Number: 5,228,663
[45] Date of Patent: Jul. 20, 1993

[54] ADJUSTABLE ELASTOMERIC BEARING HAVING A PLURALITY OF SUSPENSION ELEMENTS

[75] Inventors: Hans-Dieter Adler, Eitorf; Gerd Gäb, Ahrweiler; Wolfram Krause, Swisttal; Peter Maier, Wachtberg; Wolfgang Mönig, Stromberg; Alfred Preukschat, Königswinter, all of Fed. Rep. of Germany

[73] Assignee: BOGE AG, Eitorf, Fed. Rep. of Germany

[21] Appl. No.: 775,190

[22] Filed: Oct. 11, 1991

[30] Foreign Application Priority Data

Oct. 12, 1990 [DE] Fed. Rep. of Germany ....... 4032364
Feb. 1, 1991 [DE] Fed. Rep. of Germany ....... 4103028

[51] Int. Cl.⁵ ............................................. F16F 13/00
[52] U.S. Cl. ................................ 267/140.14; 267/219
[58] Field of Search ............. 267/140.1 A, 140.1 AE, 267/140.1 R, 219, 220, 140.11, 140.13, 140.14, 140.15; 248/636, 638, 550, 552, 562

[56] References Cited

U.S. PATENT DOCUMENTS

| | | | |
|---|---|---|---|
| 4,389,045 | 6/1983 | Taylor | 267/140.1 A |
| 4,415,148 | 11/1983 | Mair et al. | 267/140.1 R |
| 4,660,812 | 4/1987 | Dan et al. | 267/140.1 A |
| 4,867,263 | 9/1989 | Sugino et al. | 267/140.1 A |

FOREIGN PATENT DOCUMENTS

| | | |
|---|---|---|
| 2927757 | 2/1981 | Fed. Rep. of Germany . |
| 3314335 | 10/1984 | Fed. Rep. of Germany . |
| 3403002 | 8/1985 | Fed. Rep. of Germany . |
| 3448169 | 8/1985 | Fed. Rep. of Germany . |
| 3431117 | 3/1986 | Fed. Rep. of Germany . |
| 0103043 | 6/1984 | Japan ........................ 267/140.1 AE |
| 62-137437 | 6/1987 | Japan . |

Primary Examiner—Matthew C. Graham
Attorney, Agent, or Firm—Nils H. Ljungman & Associates

[57] ABSTRACT

Elastomeric bearing, consisting of an outer cover, at least one rigid intermediate body and a support body, whereby a suspension element is always located between two neighboring bodies. The suspension elements have different suspension characteristics in the radial and axial direction as well as different damping characteristics and can be adjusted using a controllable switch apparatus. It should be possible to precisely control an individual suspension element to produce different suspension and damping characteristics.

20 Claims, 6 Drawing Sheets

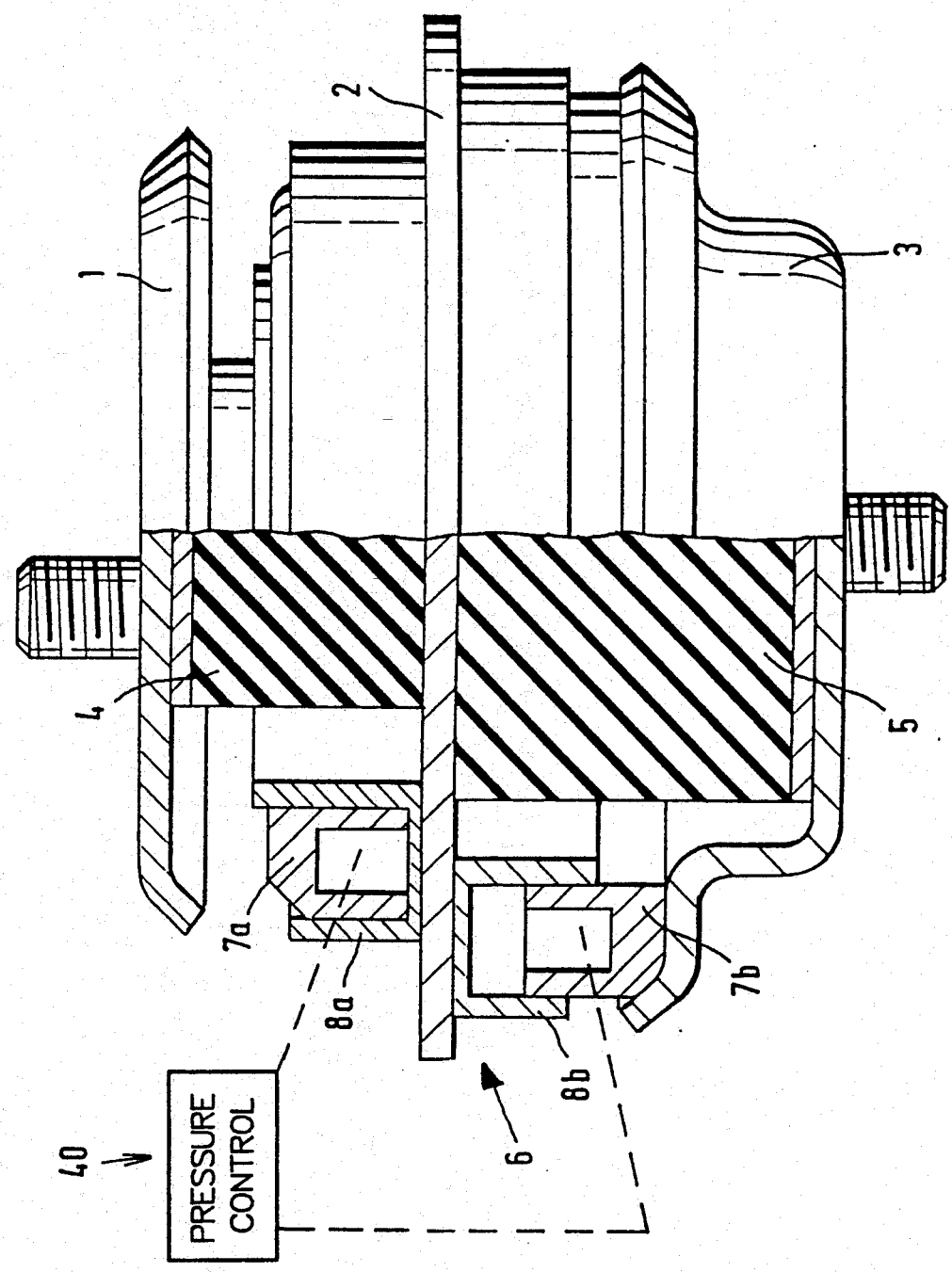

ADJUSTABLE ELASTOMERIC BEARING HAVING A PLURALITY OF SUSPENSION ELEMENTS

BACKGROUND OF THE INVENTION

1. Field of the Invention

The invention relates to an elastomeric bearing, consisting of an outer cover body, at least one rigid intermediate body, an a support body, having a suspension element always located between two neighboring bodies, whereby suspension elements have different suspension characteristics in the radial and axial directions as well as different damping characteristics and can be adjusted using a controllable switch apparatus.

2. Background Information

The prior art includes elastomeric bearings (such as Federal Republic of Germany Published Patent Application No. 29 27 757), which have attached to one bearing mount a controllable magnet which is actively connected to the other bearing mount via an armature, in particular a ferro-magnetic armature, which is separated from the magnet by a gap. The active connection between the magnet and the other bearing mount is transmitted or made by a magnetizable metal powder in the gap. As soon as this metal powder is magnetized by the magnet, the powder compacts and forms a rigid bridge between the magnet and the other bearing mount and, therefore, between the two bearing mounts. The characteristics of the entire bearing can be modified in this manner. There are also engine bearings or motor mounts (such as Federal Republic of Germany Patent No. 34 03 002), which have a support bearing and a bearing support connected to one another by a first suspension element as well as to a second suspension element which can be connected to the first suspension element under certain operating conditions. The function is based upon the interaction of the two suspension elements with a switch coupling. This switch coupling is switched in series with the relatively harder second suspension element, and the unit consisting of the second suspension element and the switch coupling is mounted parallel to the first suspension element between the bearing support and the support bearing. As a result, when the switch coupling is not activated, the suspension characteristic of the engine bearing or motor mount is determined solely by the relatively soft first suspension element; when the switch coupling is activated, the result is a composite suspension characteristic which includes the suspension characteristics of the first suspension element and of the second suspension element. Mounting two rubber springs in series results in defined suspension rates, but there remains the disadvantage that no defined damping coefficients can be achieved.

OBJECT OF THE INVENTION

The object of the invention is to control a conventional elastomeric bearing so that different suspension rates and different damping rates in the axial and radial load directions can be precisely achieved.

SUMMARY OF THE INVENTION

This object is achieved according to the invention, in that the switching apparatus is adjustable so that a number of bearings (1, 2, 3) corresponding to the number of suspension elements (4) can always be rigidly connected to one another by means of positive locking or frictional connection so that each suspension element is individually activated and all remaining suspension elements are deactivated.

The object can be achieved by way of a switch apparatus which controls means for rigidly connecting a group of bearings. The bearings can be rigidly connected to one another by means of a positive locking or frictional connection, so that each suspension element is individually activated to bear a load; all remaining suspension elements are deactivated, so that they can not bear a load.

This configuration is advantageous, in that only either the one suspension element or another suspension element is engaged, so that a defined suspension characteristic as well as a defined damping characteristic can be achieved.

In accordance with an additional significant embodiment, there is a hydraulic piston-cylinder arrangement or a mechanical transmission or an electro-magnetic apparatus as a switch apparatus.

In one configuration of the invention, the switch apparatus is located inside at least two suspension elements.

When using a hydraulic piston-cylinder arrangement, in one configuration of the invention there is at least one element of the piston-cylinder arrangement which moves axially when hydraulically pressurized and produces a frictional connection between two bearings. It is thereby advantageous to attach the piston to a piston rod, whereby there can advantageously be radial stops on the cylinder. The piston rod thus centers the bearing.

According to an additional significant embodiment of the invention, where a mechanical transmission is used as a switch apparatus, gear wheels can be used as the drive mechanism.

Another aspect of the invention resides broadly in an elastomeric bearing, comprising: a load bearing body; a support body; at least one intermediate body located between said load bearing body and said support body; a plurality of suspension elements, each suspension element of said plurality of suspension elements being located in one of: between said load bearing body and said at least one intermediate body, between said support body and said at least one intermediate body, and between two of said at least one intermediate body, wherein said at least one intermediate body comprises at least two intermediate bodies; adjustable connecting means configured for at least one of: rigidly connecting said load bearing body and said at least one intermediate body, rigidly connecting said support body and said at least one intermediate body, and rigidly connecting two of said at least one intermediate body, wherein said at least one intermediate body comprises at least two intermediate bodies; said adjustable connecting means for placing a load on a first suspension element of said plurality of suspension elements at a first time and removing the load from the other suspension elements of said plurality of suspension elements at said first time, and also for placing a load on a second suspension element of said plurality of suspension elements at a second time and removing the load from the other suspension elements of said plurality of suspension elements at said second time.

Yet another aspect of the invention resides broadly in an elastomeric bearing, comprising: first load accepting means; second load accepting means; at least first elastomeric suspension means and second elastomeric means;

said at least first and second elastomeric suspension means being disposed to accept a load from said first load accepting means and said second load accepting means; adjusting means being for selectively activating only one of said at least first and second elastomeric suspension means at one time, so that only one of said at least first and second elastomeric suspension means can accept a load at one time, and said adjusting means being for simultaneously deactivating the remainder of said at least first and second elastomeric suspension means, so that the remainder of said at least first and second elastomeric suspension means can not accept a load; and said adjusting means having means for activating said first elastomeric suspension means and deactivating said second elastomeric suspension means at a first time and activating said second elastomeric suspension means and deactivating said first elastomeric suspension means at a second time.

Preferred embodiments of the invention are schematically illustrated in the accompanying drawings.

BRIEF DESCRIPTION OF THE DRAWINGS

FIG. 2 shows a partial cross-section of an additional embodiment of an elastomeric bearing with at least one piston-cylinder arrangement, which is located on the outside of the bearing.

DESCRIPTION OF THE PREFERRED EMBODIMENTS

Figure 1:
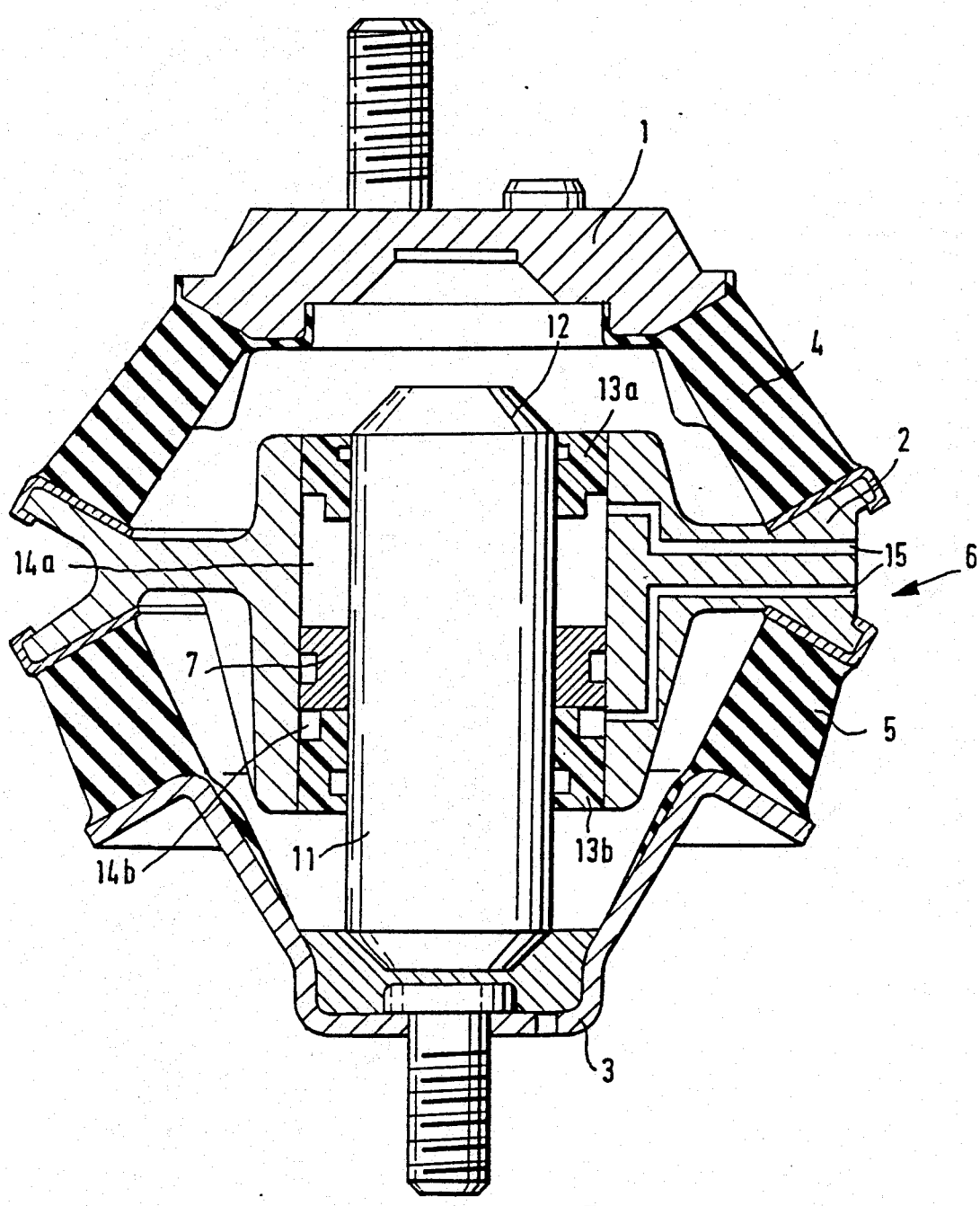
FIG. 1 shows a partial cross-section of an elastomeric bearing which is pressurized by a piston-cylinder arrangement.

The elastomeric bearing represented in FIG. 1 consists of an outer cover 1, an intermediate body 2 and a support body 3. The outer cover 1 functions as a load support body for attachment to an object to be suspended or supported, such as an engine in the case where the bearing functions as a motor mount. The support body 3 is for attachment to a support member or frame. Between the outer cover 1 and the intermediate body 2 is a first suspension element 4, and a second suspension element 5 is located between the intermediate body 2 and the support body 3. Used as a switch apparatus 6 for this embodiment is a piston-cylinder arrangement having a piston rod 11 with a piston 7 and whereby the seal elements 13a and 13b connected to the intermediate body 2, together with the piston rod 11, form an annulus 14a and 14b on each side of the piston 7. Piston 7 is fixed to piston rod 11. By means of the pressure connections 15, each annulus can be pressurized with liquid or gas so that the piston rod can be moved axially and fixed by means of the piston 7.

In the embodiment represented in FIG. 1, the piston rod 11 is in the lower position so that the intermediate body 2 and the support body 3 can be mechanically bridged so that only the suspension element 4 can be pressurized or compressed. If the piston rod 11 is moved in the opposite direction by means of pressurization of the annulus 14b, the outer cover 1 and the intermediate body 2 are mechanically bridged and only the suspension element 5 is in use. The beveled end regions 12 of the piston rod 11 serve as a radial guide, so that proper centering is ensured during insertion into the outer cover 1 or the support body 3.

Essentially all of the elastomeric bearing components are circularly symmetrical about a central longitudinal axis, such as the central longitudinal axis of piston rod 11 in the embodiment shown in FIG. 1. Suspension elements 4 and 5 can be made out of natural rubber, neoprene, or some other elastomer well known in the art. The other components can be made out of materials well known in the art, such as metal. Assembly of the components also includes well known processes such as vulcanization and welding.

Figure 1A:
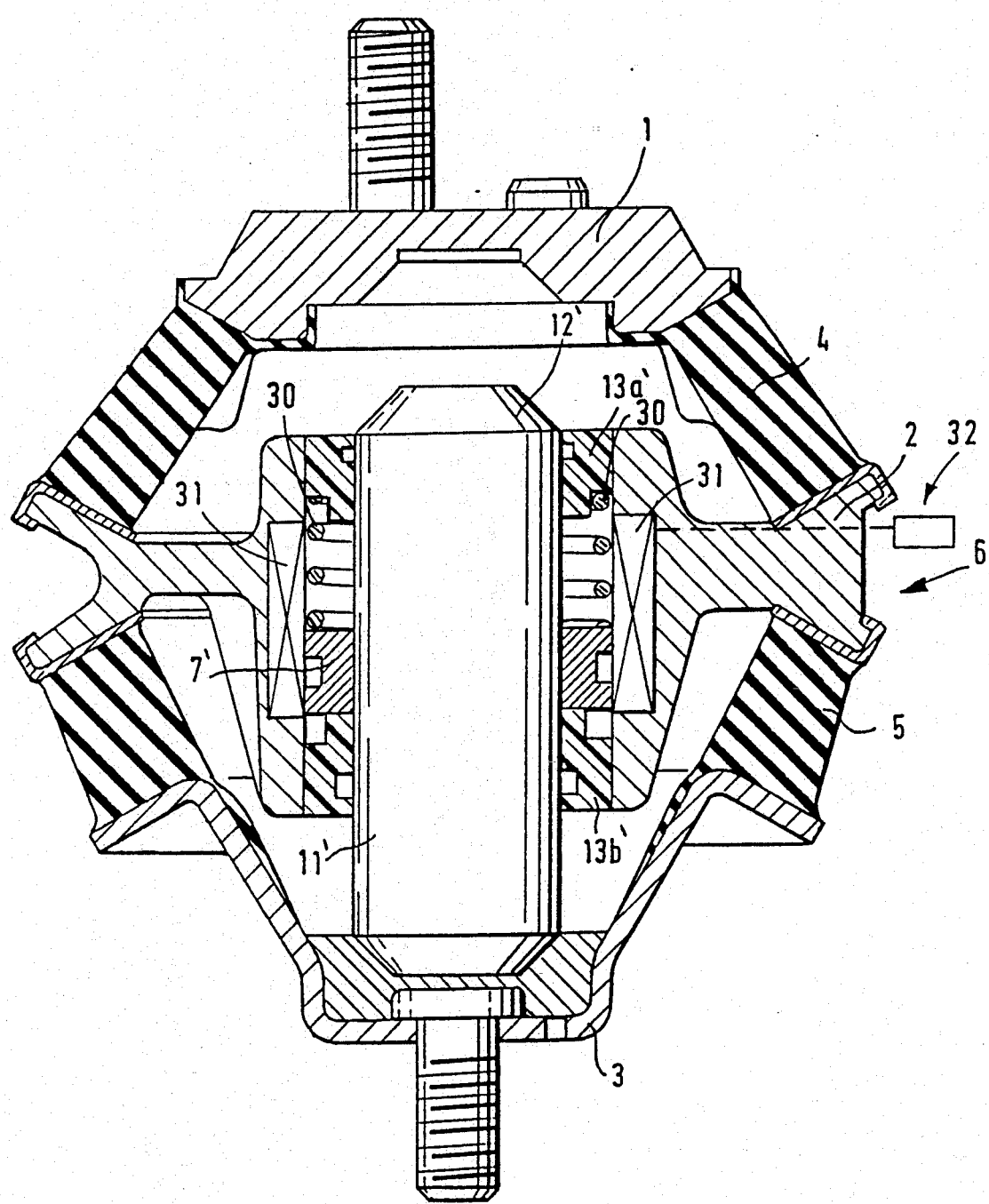
FIG. 1a shows a partial cross-section of an elastomeric bearing which is pressurized by an electromagnetic apparatus.

FIG. 1a shows an elastomeric bearing having an outer cover 1, an intermediate body 2, a support body 3, a first suspension element 4, and a second suspension element 5 all of which function very similarly to the embodiment of FIG. 1. However, the switch apparatus 6 of FIG. 1a uses an electro-magnetic apparatus. Rod 11' is able to slide between outer cover 1 and support body 3 through directing rings 13a' and 13b'. Stop 7' is fixed to Rod 11' for limiting the movement of Rod 11' and provides a surface for return spring 30 to push Rod 11' into the lower position as shown in FIG. 1a. With rod 11' held in the position shown by return spring 30, suspension element 5 is deactivated and only suspension element 4 is in use. On the other hand, control means 32 can apply a voltage to coil 31, which magnetizes stop 7'. Directing ring 13a' is made of a magnetic material, so that a magnetic force pulls stop 7' and rod 11' towards directing ring 13a'. The magnetic force is greater than the force of return spring 30, so that stop 7' moves until it comes into contact with directing ring 13a', which brings rod 11' into contact with outer cover 1 and deactivates suspension element 4, and only suspension element 5 is in use. The beveled end regions 12' of the rod 11' serve as a radial guide, so that proper centering is ensured during insertion into the outer cover 1 or the support body 3.

Figure 1B:
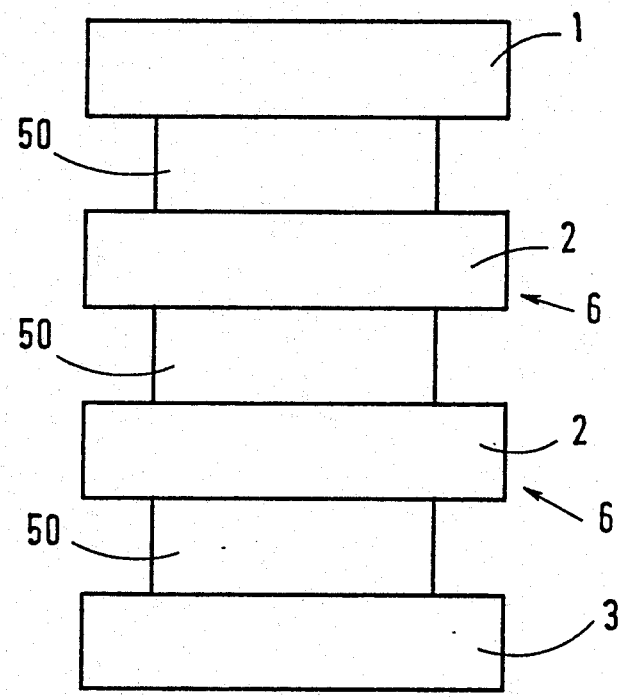
FIG. 1b is a schematic drawing of an elastomeric bearing having three suspension elements and two intermediate bodies.

In the embodiments of both FIG. 1 and FIG. 1a it is possible to add a second intermediate body 2 having a second switch apparatus 6 and a third suspension element. FIG. 1b shows an elastomeric bearing having an outer cover 1, two intermediate bodies 2, and a support body 3. Three suspension elements 50 separate the bearing bodies 1, 2, 3. Each intermediate body 2 has a switch apparatus 6. The resulting elastomeric bearing would then have one of three suspension elements 50 activated to suspend a load with the other two suspension elements 50 deactivated. Additional intermediate bodies 2, switch apparatus 6, and suspension elements 50 could also be added.

The elastomeric bearing shown in FIG. 2 in turn consists of a suspension element 4 located between the outer cover 1 and the intermediate body 2, as well as a second suspension element 5, which is located between the intermediate body 2 and the support body 3. The switch apparatus 6 is oriented coaxially around the suspension elements 4 and 5 and consists essentially of two ring-shaped pistons 7a and 7b as well as corresponding ring-shaped cylinders 8a and 8b. By means of corresponding connections, pressure can be hydraulically, pneumatically or hydro-pneumatically produced in the ring-shaped cavity between the piston 7, such as pistons 7a and 7b, and the cylinder 8, such as cylinders 8a and 8b respectively, so that in the event of axial excursion of one of the pistons 7, such as piston 7a or 7b, the corresponding suspension element 4 or 5 can be deactivated. FIG. 2 shows pressure control device 40 connected to cylinders 8a and 8b for controlling a pressure medium within the ring-shaped cavity between the piston 7, such as pistons 7a and 7b, and the cylinder 8, such as cylinders 8a and 8b. In the embodiment represented in FIG. 2, the piston 7b is pressurized and suspension element 5 is thus deactivated, and suspension and damping are performed by suspension element 4. Essentially all the components are circularly symmetrical about the central longitudinal axis passing through both suspension elements.

Figure 3A:
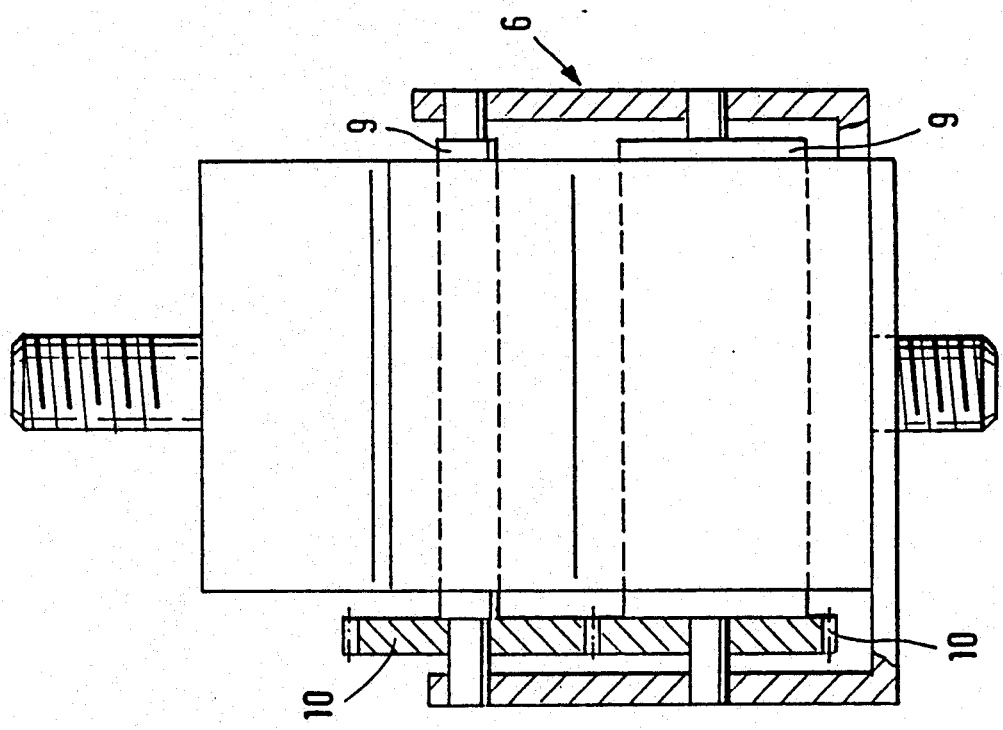
FIGS. 3a and 3b show a partial cross-section of an elastomeric bearing where a mechanical transmission is used as a switch apparatus.
Figure 3B:
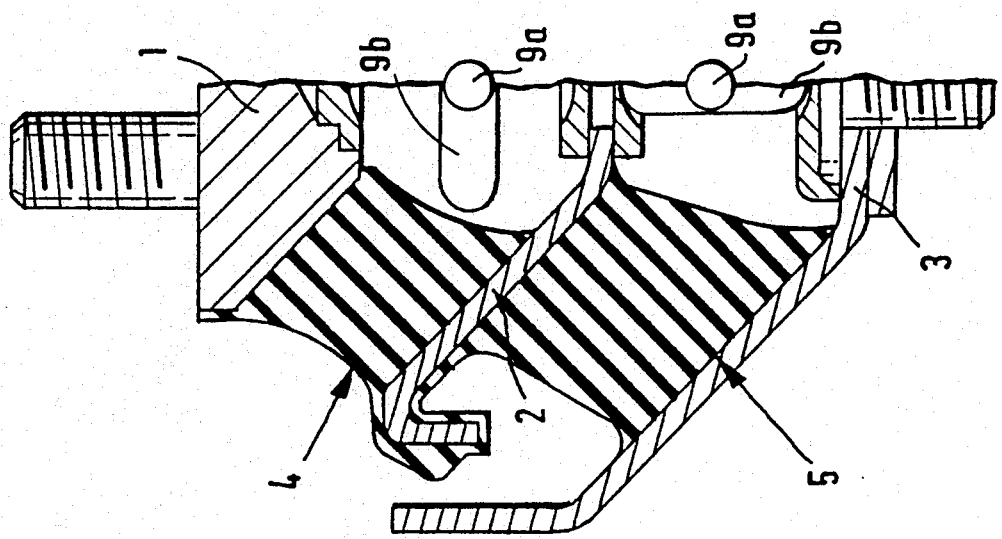

FIG. 3 shows an elastomeric bearing consisting of the outer cover 1, the intermediate body 2 and the support body 3. The suspension elements 4 and 5 are located between the individual bodies. The switch apparatus 6 is configured as a mechanical linkage 9 and is activated using gear wheels 10. The upper area of the drawing shows the mechanical linkage 9 configured as a pivot 9a with a longitudinal cam 9b mounted transversely to the longitudinal axis. This position of the mechanical transmission 9 allows axial movement of the suspension element 4, while in the lower area of the drawing, the mechanical transmission 9 has been switched so that the longitudinal cam 9b is positioned as an axial stop. In this position, the suspension element 4 assumes the damping and suspension functions. During switching, the gear wheels 10 are used to bring the respective longitudinal cams 9b of the mechanical transmission 9 into the opposite position, so that the suspension element 4 can then be deactivated and the suspension element 5 can be activated.

Figure 4:
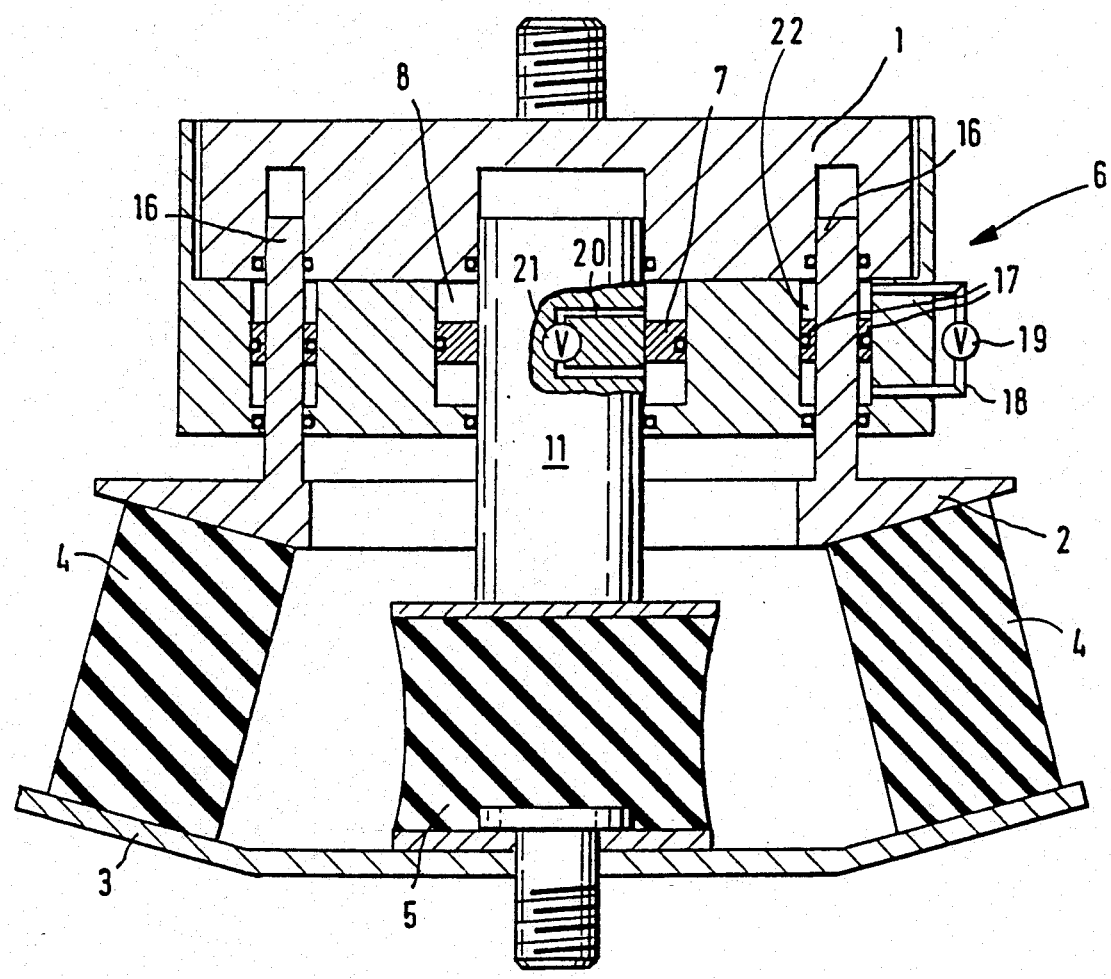
FIG. 4 shows a partial cross-section of an elastomeric bearing with a hydraulic piston-cylinder arrangement as a switch apparatus.

FIG. 4 shows an elastomeric bearing in which there is the outer cover 1, the intermediate body 2, the support body 3, the suspension element 4 and suspension element 5. The switch apparatus 6 is located in the vicinity of the outer cover 1. More precisely, the suspension element 4 is located between the intermediate body 2 and the support body 3 and connected to the switch apparatus by means of a ring-shaped element 16. The ring-shaped element 16 has two individual rings 17 firmly attached to the ring-shaped element 16, which rings are located as pistons in the cylinder 22. Both partial chambers are connected to one another via connecting conduit 18 and controlled using a shut-off valve 19. In addition, the inner and outer portions of each partial chamber are connected by a communication channel which passes through ring-shaped element 16; the communication channels allow fluid to pass between the inner and outer portion of a partial chamber but not between the two partial chambers of cylinder 22. As long as the shut-off valve 19 in the connecting conduit 18 is open, the rings 17 as pistons can move the fluid from one chamber to the other chamber, thus deactivating the suspension element 4. If the shut-off valve 19 is closed, no exchange of fluid is possible via the connecting conduit 18 and the suspension element 4 can be moved axially. Suspension element 4 can be either a ring-shaped spring or individual rectangular springs.

Suspension element 5, on the other hand, is connected via the piston rod 11 to the piston 7. The cylinder 8 is divided by the piston into two partial chambers, which are also connected to each other via a connecting conduit 20 and can be isolated from one another via the shut-off valve 21. Axial movement of the suspension element 5 is also impossible here unless the shut-off valve 21 is open and the fluid in cylinder 8 can flow from one partial chamber to the other partial chamber. If the shut-off valve 21 is closed, suspension element 5 is activated. As a result of the parallel orientation of the suspension elements 4 and 5, the two suspension elements can be individually switched, independently of one another, and both suspension elements can be switched jointly. Essentially all the components are circularly symmetrical, unless stated otherwise, about the central longitudinal axis passing through the piston rod 11.

In summary, one feature of the invention resides broadly in an elastomeric bearing, consisting of an outer cover or load-bearing body, at least one rigid intermediate body and a support body, having a suspension element always located between two neighboring bodies, whereby the suspension elements have different suspension characteristics in the radial and axial directions as well as different damping characteristics, and can be adjusted using a controllable switch apparatus, characterized by the fact that, the switching apparatus 6 is adjustable so that a number of bearings 1, 2, 3 corresponding to the number of suspension elements 4 can always be rigidly connected to one another by means of positive locking or frictional connection so that each suspension element 4, 5 is individually activated and all remaining suspension elements 4, 5 are deactivated.

Another feature of the invention resides broadly in an elastomeric bearing characterized by the fact that there is a hydraulic piston-cylinder arrangement 7, 8 as a switch apparatus 6.

Yet another feature of the invention resides broadly in an elastomeric bearing characterized by the fact that the switch apparatus 6 is located inside at least two suspension elements 4, 5.

A further feature of the invention resides broadly in an elastomeric bearing characterized by the fact that there is a mechanical transmission 9 as a switch apparatus 6.

A yet further feature of the invention resides broadly in an elastomeric bearing characterized by the fact that there is an electro-magnetic apparatus as a switch apparatus 6.

Yet another further feature of the invention resides broadly in an elastomeric bearing characterized by the fact that at least one element of the piston-cylinder arrangement 7, 8 moves axially when hydraulically pressurized and produces a frictional connection between two bearings 1, 2, 3.

A further additional feature of the invention resides broadly in an elastomeric bearing characterized by the fact that the mechanical transmission 9 is driven by gear wheels 10.

A yet further additional feature of the invention resides broadly in an elastomeric bearing characterized by the fact that the piston 7 is connected to a piston rod 11.

Another further feature of the invention resides broadly in an elastomeric bearing characterized by the fact that the piston rod centers the bearing.

A still further feature of the invention resides broadly in an elastomeric bearing characterized by the fact that there are radial stops 12 on the cylinder 11.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. An elastomeric bearing, comprising:
   a first body;
   a second body;
   an intermediate body located between said first body and said second body;
   a first elastomeric suspension element disposed between said first body and said intermediate body;
   a second elastomeric suspension element disposed between said second body and said intermediate body; and
   adjustable connecting means configured for alternately rigidly connecting:
   a) said first body and said intermediate body to rigidly connect said first body and said intermediate body, and to permit a vibrational load to be impressed upon said second suspension element; and
   b) said second body and said intermediate body to rigidly connect said second body and said intermediate body, and to permit a vibrational load to be impressed upon said first suspension element.

2. The elastomeric bearing of claim 1, wherein:
   each of said first and second suspension elements has a radial direction and an axial direction;
   each of said first and second suspension elements has different suspension characteristics in said radial direction and said axial direction;
   each of said first and second suspension elements has different damping characteristics in said radial direction and said axial direction; and
   said adjustable connecting means being configured to rigidly connect, comprising means for one of:
   a) positive locking and
   b) frictionally connecting.

3. The elastomeric bearing of claim 2, wherein said adjustable connecting means comprises an electro-magnetic apparatus for at least one of:
   a) rigidly connecting said load bearing body and said at least one intermediate body,
   b) rigidly connecting said support body and said at least one intermediate body, and
   c) rigidly connecting two of said at least one intermediate body, wherein said at least one intermediate body comprises at least two intermediate bodies.

4. The elastomeric bearing of claim 2, wherein said adjustable connecting means comprises a hydraulic piston-cylinder arrangement, and said piston-cylinder arrangement comprises at least one piston and at least one cylinder.

5. The elastomeric bearing of claim 1, wherein at least one of said at least one piston and said at least one cylinder moves axially when hydraulically pressurized and produces a frictional connection.

6. The elastomeric bearing of claim 5, wherein:
   said piston comprises a piston rod, said piston rod for centering at least one of said first body, said second body, and said intermediate body; and
   said piston rod comprising beveled end portions for centering at least one of said first body, said second body, and said intermediate body.

7. The elastomeric bearing of claim 6, wherein:
   said intermediate body comprises a plurality of intermediate bodies;
   said elastomeric bearing further comprises a plurality of elastomeric suspension elements, said plurality of elastomeric suspension elements comprising said first suspension element, said second suspension element and at least one additional elastomeric suspension element, each additional suspension element being located between two of said plurality of intermediate bodies; and
   said adjustable connecting means is further configured for selectively rigidly connecting a subset of said plurality of intermediate bodies to rigidly connect said subset of said plurality of intermediate bodies, and to permit a vibrational load to be impressed upon at least one of said plurality of suspension elements.

8. The elastomeric bearing of claim 6, wherein:
   said first body comprises a load support body, said load support body comprising means for attaching said load support body to an engine; and
   said second body comprises a support body, said support body comprising means for attaching said support body to one of: a support member and a frame.

9. The elastomeric bearing of claim 8, wherein:
   said adjustable connecting means has an annulus located between said piston rod and said cylinder;
   said cylinder has a first end and a second end;
   said adjustable connecting means further comprises a first seal element and a second seal element;
   said first and second seal elements are disposed in said annulus at said first and second ends, respectively, of said cylinder;
   said first and second seal elements are disposed between said piston rod and said cylinder to seal said annulus;
   said piston divides said annulus into:
     a first annular chamber bounded by said cylinder, said piston rod, said piston and said first seal element, and
     a second annular chamber bounded by said cylinder, said piston rod, said piston and said second seal element;
   said adjustable connecting means further comprises a first fluid passage and a second fluid passage, said first and second fluid passages for connecting said first and second annular chambers, respectively, to a source of pressure for alternately pressurizing said first and second annular chambers;
   said first and second fluid passages are located in said intermediate body;
   one of:
     said piston, and said first seal element,
comprises a first shoulder for seating said piston against said first seal element;
said first shoulder is disposed adjacent to said piston rod;
said piston, said first shoulder and said first seal element are configured such that said first fluid passage communicates with said first annular chamber when said piston is seated against said first seal element;
one of:
said piston, and
said second seal element,
comprises a second shoulder for seating said piston against said second seal element;
said second shoulder is disposed adjacent to said piston rod; and
said piston, said second shoulder and said second seal element are configured such that said second fluid passage communicates with said second annular chamber when said piston is seated against said second seal element.

10. The elastomeric bearing of claim 9, wherein:
said bearing has a longitudinal axis passing through said first body, said second body and said intermediate body; and
said first body, said second body, said intermediate body, said piston, said piston rod and said cylinder are substantially rotationally symmetrical about said longitudinal axis.

11. An elastomeric bearing, comprising:
first load accepting means;
second load accepting means;
at least first elastomeric suspension means and second elastomeric suspension means;
said at least first and second elastomeric suspension means being disposed to accept a load from said first load accepting means and said second load accepting means;
adjusting means for:
selectively enabling only one of said at least first and second elastomeric suspension means at one time to accept a load at one time; and
simultaneously disabling the remainder of said at least first and second elastomeric suspension means from accepting a load; and
said adjusting means having means for enabling said first elastomeric suspension means and disabling said second elastomeric suspension means at a first time and enabling said second elastomeric suspension means and disabling said first elastomeric suspension means at a second time.

12. The elastomeric bearing of claim 11, comprising:
a rigid intermediate body located between said first elastomeric suspension means and said second elastomeric suspension means; and
said adjusting means comprising means for selectively rigidly connecting said rigid intermediate body to one of said first load accepting means and said second load accepting means, for disabling one of said first elastomeric suspension means and said second elastomeric suspension means.

13. The elastomeric bearing of claim 12, including at least one additional rigid intermediate body located between said first elastomeric suspension means and said second elastomeric suspension means.

14. The elastomeric bearing of claim 13, wherein said at least first elastomeric suspension means and second elastomeric suspension means comprises a plurality of suspension means at least some of which are disposed between said rigid intermediate bodies.

15. The elastomeric bearing of claim 12 wherein:
each of said at least first elastomeric suspension means and second elastomeric suspension means have radial and axial directions;
each of said at least first elastomeric suspension means and second elastomeric suspension means have different suspension characteristics in the radial and axial directions; and
each of said at least first elastomeric suspension means and second elastomeric suspension means have different damping characteristics in the radial and axial directions.

16. The elastomeric bearing of claim 15, wherein said adjusting means comprises a hydraulic piston-cylinder arrangement, said hydraulic piston-cylinder arrangement comprising at least one piston and at least one cylinder for selectively rigidly connecting said rigid intermediate body to one of said first load accepting means and said second load accepting means, for deactivating one of said first elastomeric suspension means and said second elastomeric suspension means.

17. The elastomeric bearing of claim 16, wherein:
at least one of said at least one piston and said at least one cylinder moves axially when hydraulically pressurized and produces a frictional connection for selectively rigidly connecting said rigid intermediate body to one of said first load accepting means and said second load accepting means, for deactivating one of said first elastomeric suspension means and said second elastomeric suspension means;
said piston comprises a piston rod, said piston rod for centering at least one of said first load accepting means, said second load accepting means, and said rigid intermediate body; and
said piston rod comprising beveled end portions for centering at least one of said first load accepting means, said second load accepting means, and said rigid intermediate body.

18. The elastomeric bearing of claim 15, wherein said adjusting means is located inside said at least first and second elastomeric suspension means.

19. The elastomeric bearing of claim 15, wherein:
said adjusting means comprises a mechanical transmission and gear wheels, said gear wheels for driving said mechanical transmission; and
said mechanical transmission comprises a plurality of rotatable cams, each rotatable cam for selectively rigidly connecting said rigid intermediate body to one of said first load accepting means and said second load accepting means, for deactivating one of said first elastomeric suspension means and said second elastomeric suspension means.

20. The elastomeric bearing of claim 15, wherein said adjustable connecting means comprises an electro-magnetic apparatus for selectively rigidly connecting said rigid intermediate body to one of said first load accepting means and said second load accepting means, for deactivating one of said first elastomeric suspension means and said second elastomeric suspension means.

* * * * *

UNITED STATES PATENT AND TRADEMARK OFFICE
CERTIFICATE OF CORRECTION

PATENT NO. : 5,228,663
DATED : July 20, 1993
INVENTOR(S) : Hans-Dieter ADLER, Gerd GÄB, Wolfram KRAUSE, Peter MAIER, Wolfgang MÖNIG and Alfred PREUKSCHAT It is certified that error appears in the above-indentified patent and that said Letters Patent is hereby corrected as shown below:

In column 8, line 3, Claim 5, after 'claim', delete "1" and insert --4--.

Signed and Sealed this

Twelfth Day of July, 1994

*Attest:*

BRUCE LEHMAN

*Attesting Officer*     *Commissioner of Patents and Trademarks*